(12) United States Patent
Wu et al.

(10) Patent No.: US 11,794,899 B2
(45) Date of Patent: *Oct. 24, 2023

(54) METHOD FOR CONTROLLING UNMANNED AIRCRAFT, SERVER, AND REMOTE CONTROL DEVICE

(71) Applicant: SZ DJI TECHNOLOGY CO., LTD., Shenzhen (CN)

(72) Inventors: Xumin Wu, Shenzhen (CN); Chunming Wang, Shenzhen (CN); Qirong Deng, Shenzhen (CN); Heli Zhong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,809

(22) Filed: Feb. 20, 2022

(65) Prior Publication Data
US 2022/0169384 A1 Jun. 2, 2022

Related U.S. Application Data

(63) Continuation of application No. 16/418,149, filed on May 21, 2019, now Pat. No. 11,254,428, which is a (Continued)

(51) Int. Cl.
*B64C 39/02* (2023.01)
*G05D 1/00* (2006.01)
(Continued)

(52) U.S. Cl.
CPC .......... *B64C 39/024* (2013.01); *G05D 1/0011* (2013.01); *G08B 21/182* (2013.01);
(Continued)

(58) Field of Classification Search
CPC ..... B64C 39/024; B64C 39/02; G05D 1/0011; G05D 1/0022; G05D 1/00; G08B 21/182;
(Continued)

(56) References Cited

U.S. PATENT DOCUMENTS 6,813,777 B1 * 11/2004 Weinberger ........... H04L 67/565
348/E7.071
8,983,682 B1 3/2015 Peeters et al.
(Continued)

FOREIGN PATENT DOCUMENTS

CN 201429796 Y 3/2010
CN 104570872 A 4/2015
(Continued)

OTHER PUBLICATIONS

The World Intellectual Property Organization (WIPO) International Search Report for PCT/CN2016/106998 dated Aug. 22, 2017 6 Pages.

*Primary Examiner* — Yonel Beaulieu
(74) *Attorney, Agent, or Firm* — ANOVA LAW GROUP, PLLC

(57) ABSTRACT

A method for controlling an unmanned aerial vehicle (UAV) includes receiving locking instruction information for locking the UAV; remotely controlling, based on the locking instruction information, a remote control device of the UAV to lock the UAV; and remotely controlling, after controlling the remote control device to lock the UAV, the remote control device to unlock the UAV.

20 Claims, 6 Drawing Sheets

Receive locking instruction information transmitted by a user terminal for locking the UAV — 101

Based on the locking instruction information, transmit a locking command to the remote control device of the UAV to enable the remote control device to lock the UAV based on the locking command — 102

Related U.S. Application Data continuation of application No. PCT/CN2016/106998, filed on Nov. 23, 2016.

(51) Int. Cl.
  *G08C 17/02* (2006.01)
  *G08B 21/18* (2006.01)
  *B64U 101/00* (2023.01)
  *B64U 101/30* (2023.01)

(52) U.S. Cl.
  CPC .......... *G08C 17/02* (2013.01); *B64U 2101/00* (2023.01); *B64U 2101/30* (2023.01); *B64U 2201/20* (2023.01)

(58) Field of Classification Search
  CPC ............... G08C 17/02; B64U 2101/00; B64U 2101/30; B64U 2201/20; B64U 2201/00; B64D 45/0015
  See application file for complete search history.

(56) References Cited

U.S. PATENT DOCUMENTS

| | | | |
|---|---|---|---|
| 9,194,168 B1 | 11/2015 | Lu et al. | |
| 9,307,383 B1 | 4/2016 | Patrick | |
| 9,412,278 B1 | 8/2016 | Gong et al. | |
| 9,523,986 B1 | 12/2016 | Abebe et al. | |
| 10,152,060 B2 | 12/2018 | Gordon et al. | |
| 10,310,498 B2 | 6/2019 | Petruzzelli | |
| 10,587,790 B2 | 3/2020 | Li et al. | |
| 10,600,295 B2 | 3/2020 | Kempel et al. | |
| 10,798,547 B2* | 10/2020 | Gold | G06Q 30/0207 |
| 11,254,428 B2* | 2/2022 | Wu | B64C 39/024 |
| 2004/0030462 A1 | 2/2004 | Magner et al. | |
| 2006/0058936 A1 | 3/2006 | Johnston | |
| 2006/0149431 A1 | 7/2006 | Wilson et al. | |
| 2014/0032034 A1 | 1/2014 | Raptopoulos et al. | |
| 2015/0276353 A1 | 10/2015 | Ueno et al. | |
| 2015/0321758 A1 | 11/2015 | Sarna | |
| 2016/0163204 A1 | 6/2016 | Raptopoulos et al. | |
| 2016/0284221 A1 | 9/2016 | Hinkle et al. | |
| 2017/0083979 A1* | 3/2017 | Winn | H04Q 9/02 |
| 2017/0147975 A1 | 5/2017 | Natarajan et al. | |
| 2017/0364065 A1 | 12/2017 | Petruzzelli | |
| 2018/0167394 A1* | 6/2018 | High | H04L 63/10 |
| 2018/0174102 A1 | 6/2018 | Winkle et al. | |
| 2018/0201285 A1* | 7/2018 | Brooks | B61C 17/00 |
| 2018/0288304 A1 | 10/2018 | Li et al. | |
| 2019/0244448 A1* | 8/2019 | Alamin | G07C 9/20 |
| 2019/0266899 A1 | 8/2019 | Ringer et al. | |
| 2019/0313228 A1 | 10/2019 | Ferreira et al. | |
| 2020/0090255 A1 | 3/2020 | Rodriguez et al. | |
| 2021/0118252 A1* | 4/2021 | Huang | H04L 63/0428 |
| 2021/0373557 A1* | 12/2021 | Tazume | B64D 1/12 |

FOREIGN PATENT DOCUMENTS

| | | | | |
|---|---|---|---|---|
| CN | 105793792 A | 7/2016 | | |
| CN | 105938371 A | 9/2016 | | |
| EP | 3816037 A1 * | 5/2021 | | B60P 3/00 |

* cited by examiner

METHOD FOR CONTROLLING UNMANNED AIRCRAFT, SERVER, AND REMOTE CONTROL DEVICE

CROSS-REFERENCE TO RELATED APPLICATIONS

This application is a continuation of application Ser. No. 16/418,149, now U.S. Pat. No. 11,254,428, filed on May 21, 2019, which is a continuation of International Application No. PCT/CN2016/106998, filed on Nov. 23, 2016, the entire contents of both of which are incorporated herein by reference.

TECHNICAL FIELD

The present disclosure relates to the technology field of unmanned vehicles and, more particularly, to a method for controlling an unmanned aircraft, a server, and a remote control device.

BACKGROUND

Unmanned aerial vehicles ("UAVs") have been widely used in industries such as agriculture, forest, etc., to perform various tasks. UAVs have been proven to increase work efficiency, reduce cost, and improve safety. It is expected that UAVs will be deployed in more and more applications in the future, and UAV technologies will be further advanced.

In current technologies, the actual operator of a UAV in performing a task may not be the owner of the UAV. For example, after a customer purchases the UAV, the customer may lease or rent the UAV to other people. In some cases, the customer may authorize a company's UAV operator to operate the UAV to accomplish certain tasks. In performing a task, the UAV may be controlled by a remote control device operated by an operator. The owner of the UAV often does not have direct control of the flight of the UAV. In certain situations, when the actual operator has unreasonable behavior, or when the lease expires, the owner of the UAV cannot have the actual control of the UAV in time, which causes much inconvenience to the owner.

SUMMARY

In accordance with an aspect of the present disclosure, there is provided a method for controlling an unmanned aerial vehicle ("UAV"). The method includes receiving locking instruction information from a user terminal for locking the UAV. The method also includes transmitting a locking command to a remote control device of the UAV based on the locking instruction information, to instruct the remote control device to lock the UAV based on the locking command.

In accordance with another aspect of the present disclosure, there is also provided a server. The server includes a locking instruction receiver configured to receive locking instruction information from a user terminal for locking an unmanned aerial vehicle ("UAV"). The server also includes a locking command transmitter configured to transmit a locking command to a remote control device of the UAV based on the locking instruction information, to enable the remote control device to lock the UAV based on the locking command.

In accordance with another aspect of the present disclosure, there is also provided a remote control device for an unmanned aerial vehicle ("UAV"). The remote control device includes a locking command receiver configured to receive a locking command transmitted by a server. The remote control device also includes a locking device configured to lock the UAV based on the locking command.

The present disclosure provides a method for controlling a UAV, a server, and a remote control device. The UAV control method may include receiving locking instruction information from a user terminal for locking the UAV. The method may include transmitting a locking command to the remote control device of the UAV based on the locking instruction information, such that the remote control device may lock the UAV based on the locking command. As such, the owner of the UAV may take over the control of the UAV in time when the lease is about to expire (or has expired) or the operator of the UAV has some unreasonable behavior. This can avoid continued operation of the UAV by the lease or the operator. As such, the control of the UAV becomes flexible, which provides convenience to the owner.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
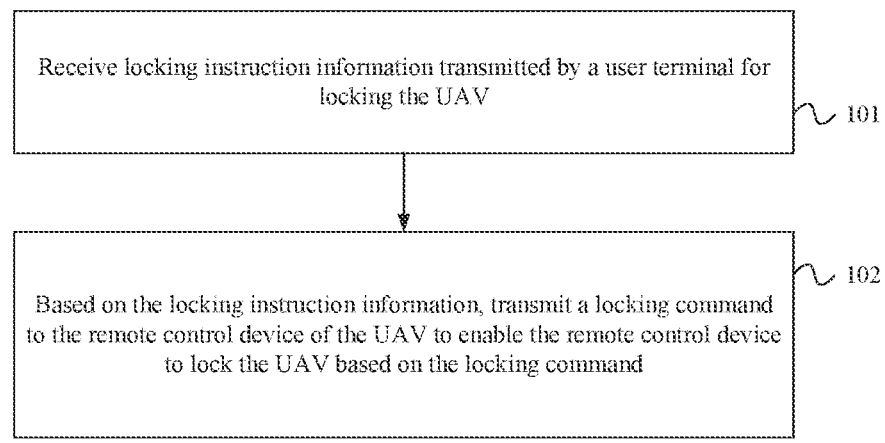
FIG. 1 is a flow chart illustrating a method for controlling a UAV, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

Embodiments of the present disclosure may be applied to agriculture, forest, farming, and fishing industries. For example, in agriculture and forest applications, UAVs may be used to spread seeds, monitor growth of the crops, perform precise irrigation and fertilization. In farming applications, UAVs may be used to monitor the environment in which the animals are raised and the growth of the animals, thereby realizing fine feeding, disease alarm, and scientific breeding. As a result, the production efficiency is enhanced, and the risk associated with raising animals is reduced. In finishing industry, UAVs may be used to monitor, in real time, the environment in the water body, and to precisely and automatically drop food, thereby increasing the aquatic farming efficiency.

In some embodiments, the present disclosure provides a method for controlling a UAV. FIG. 1 is a flow chart illustrating a method for controlling a UAV. The method may include:

Step 101: receiving locking instruction information transmitted by a user terminal for locking the UAV.

Figure 2:
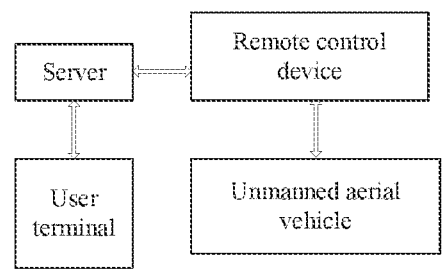
FIG. 2 is schematic illustration of an application scene of the method for controlling the UAV, according to another example embodiment.

FIG. 2 is a schematic illustration of an application scene of the method for controlling the UAV. As shown in FIG. 2, in the entire process of controlling the UAV, various devices and systems may be involved, such as a server, a user terminal, a remote control device, and a UAV.

In some embodiments, the user terminal may be controlled by a user. The user may input locking instruction information through the user terminal. Unless otherwise noted, in the present disclosure, the user refers to the owner, manager, or lessor of the UAV. The user terminal may be a cell phone, a tablet, a computer, a digital broadcasting terminal, a message receiving/transmitting device, a game control console, a personal digital assistant, etc.

In some embodiments, the remote control device may be controlled by an operator. The operator may control the takeoff, task performing, or landing of the UAV through a suitable input device, such as a key, a button, a joystick, a touch screen, etc. While performing the task, the UAV may send data back to the remote control device.

In some embodiments, the entity for performing the disclosed methods may be a server. The server may communicate with a user through the user terminal. In some embodiments, the server may exchange data with the remote control device. The server may be configured to receive the locking instruction information transmitted by the user terminal. The locking instruction information may be input by the user when the lease of the UAV is about to expire or has expired, or when the user observes an abnormal condition in the UAV.

Step 102: based on the locking instruction information, transmitting a locking command to the remote control device of the UAV to enable the remote control device to lock the UAV based on the locking command.

In some embodiments, after receiving the locking command transmitted by the server, if the UAV is already landed on the ground, the remote control device may directly lock the UAV. If the UAV is in the air, the remote control device may lock the UAV after the UAV has landed.

In some embodiments, locking the UAV means that the operator can no longer control the UAV to fly. In some embodiments, after the remote control device locks the UAV based on the locking command, if the remote control device receives an operating command input by the operator for controlling the UAV, the remote control device may abandon the operating command (e.g., by not executing the operating command). In some embodiments, the remote control device may display a message to the operator indicating that the UAV has been locked, to remind the operator that the UAV has been locked by the user and the remote control device cannot execute any operating command input by the operator.

In some embodiments, the user may lock the UAV based on actual needs or based on the status of the UAV.

In some embodiments, prior to receiving the locking instruction information transmitted by the user terminal for locking the UAV in step 101, the method may also include:

obtaining task performing information uploaded by the UAV in real time while performing the task; transmitting the task performing information to the user terminal, such that the user terminal may provide the task performing information to the user. As such, the user may input the locking instruction information when observing an anomaly in the task performing information.

In some embodiments, the task performing information may include at least one of: a flight location, a flight velocity, a flight height, or an aerial photographing image. In some embodiments, the task performing information may also include sensor information acquired by sensors embedded in the UAV, such as the temperature information, humidity information, air pressure information, wind direction and wind power information, etc.

In some embodiments, while performing a task, the UAV may transmit the task performing information to the remote control device in real time. The remote control device may transmit the task performing information to the server. In some embodiments, the UAV may directly transmit the task performing information to the server.

In some embodiments, the server may transmit the task performing information to the user terminal after receiving the task performing information. The user terminal may provide the task performing information to the user. Various methods may be used to provide the task performing information to the user, such as through texts, images, voices or audios, and videos, etc.

In some embodiments, when the user notices an anomaly in the task performing information, the user may input the locking instruction information. The anomaly in the task performing information may include at least one of the following: a deviation of the flight path of the UAV from a specified flight path, the flight speed or height of the UAV has exceeded one or more predetermined values, or the images captures by the UAV do not match images of the predetermined working region.

In some embodiments, after the user inputs the locking instruction information, the user terminal may transmit the locking instruction information to the server. The server may transmit a locking command to the remote control device based on step 102 to instruct the remote control device to lock the UAV.

In some embodiments, when the UAV uploads task performing information in real time while performing the task, the user can input the locking instruction information when observing an anomaly in the task performing information, such that the UAV may be locked. This enables the user to handle various emergency situations, thereby improving the UAV control efficiency.

In some embodiments, the locking instruction information may include a scheduled locking time. Correspondingly, step 102 (i.e., based on the locking instruction information, transmitting a locking command to the remote control device of the UAV) may include:

based on the locking instruction information, at the scheduled locking time, transmitting the locking command to the remote control device of the UAV, such that the remote control device locks the UAV at or right after the scheduled locking time.

In some embodiments, when the user transmits the locking instruction information, the user may include a scheduled locking time, such as 20:00 on Nov. 21, 2016. After receiving the locking instruction information, the server may transmit the locking command to the remote control device at 20:00 on Nov. 21, 2016 to lock the UAV. In some embodiments, the scheduled locking time may be 2 hours after the server receives the locking instruction information. Then, 2 hours after the server receives the locking instruction information, the server may transmit the locking command to the remote control device to lock the UAV.

In some embodiments, by setting the scheduled locking time, the server may automatically transmit the locking command to the remote control device to lock the UAV at or right after the scheduled time, thereby saving time for the user and providing convenience to the user.

In some embodiments, the locking instruction information may include: an authorized flight mileage. Correspondingly, step 102 (i.e., based on the locking instruction information, transmitting a locking command to the remote control device of the UAV) may include:

obtaining a total flight mileage travelled by the UAV after the use of the UAV is authorized; when the total flight mileage of the UAV reaches the authorized flight mileage (e.g., when the total flight mileage is greater than or equal to the authorized flight mileage), transmitting the locking command to the remote control device.

In some embodiments, the server may obtain the total flight mileage after the use of the UAV is authorized directly from the UAV. Alternatively, the UAV may transmit the total flight mileage to the remote control device, and the remote control device may transmit the total flight mileage to the server.

In some embodiments, the UAV or the remote control device may transmit the total flight mileage to the server. In some embodiments, the UAV may transmit the flight velocity to the server in real time. The server may calculate the total flight mileage based on the flight velocity and a corresponding flight time duration.

In some embodiments, after the user authorizes a lessee to use the UAV, the user may transmit the locking instruction information to the server. The locking instruction information may indicate that the authorized flight mileage for the lessee to use the UAV is, e.g., 1000 km. Then, after the total flight mileage travelled by the UAV after the use of the UAV is authorized reaches 1000 km, the server may transmit the locking command to the remote control device of the UAV to lock the UAV.

In some embodiments, the locking instruction information may include an authorized flight time. Correspondingly, step 102 (i.e., based on the locking instruction information, transmitting a locking command to the remote control device of the UAV) may include:

obtaining a total flight time of the UAV after the use of the UAV is authorized; when the total flight time reaches the authorized flight time (e.g., when the total flight time is greater than or equal to the authorized flight time), transmitting the locking command to the remote control device.

In some embodiments, similar to the situation with the authorized flight mileage, the user may transmit the locking instruction information to the server after the user authorizes the lessee to use the UAV. The locking instruction information may indicate that the lessee is authorized to be use the UAV for a total flight time of 1000 hours. Then, after the post-authorization total flight time of the UAV reaches 1000 hours, the server may transmit the locking command to the remote control device to lock the UAV.

In some embodiments, by setting the authorized flight mileage and/or the authorized flight time, the server may automatically instruct the remote control device to lock the UAV when the post-authorization total flight mileage and/or the total flight time of the UAV reaches the authorized flight mileage and/or the authorized flight time. The user does not need to monitor the flight status of the UAV in real time. Therefore, the lease management efficiency is improved.

According to the method for controlling a UAV of the present disclosure, locking instruction information may be received from the user terminal for locking the UAV. Based on the locking instruction information, a locking command may be transmitted to the remote control device of the UAV, such that the remote control device may lock the UAV based on the locking command. The disclosed method provides timely control of the UAV to lock the UAV when lease expires or when the operator of the UAV conducts unreasonable behavior. The disclosed method can avoid continued operation of the UAV by the lessee or the operator, thereby realizing flexible control of the UAV, and providing convenience to the user.

The present disclosure also provides another method for controlling a UAV. This UAV control method may be based on the UAV control method described above in connection with FIG. 1, and may have additional features, such as an unlocking function.

Figure 3:
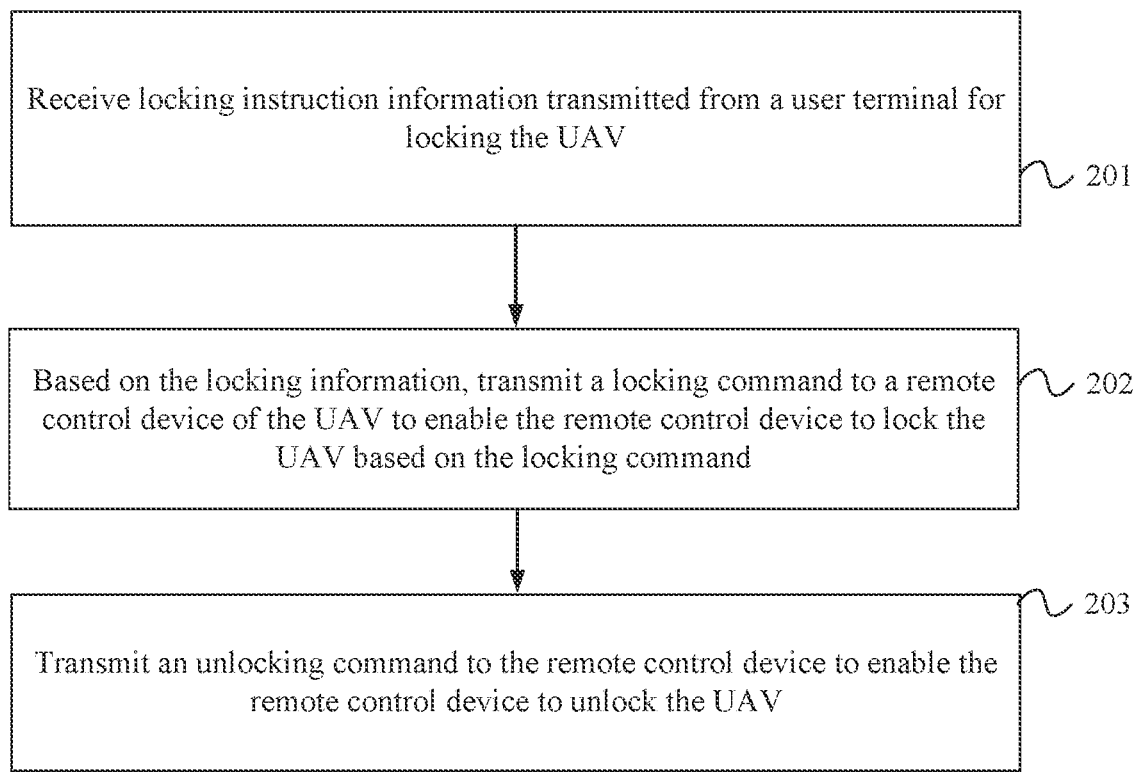
FIG. 3 is a flow chart illustrating a method for controlling a UAV, according to another example embodiment.

FIG. 3 is a flow chart illustrating a method for controlling a UAV. The method of FIG. 3 may include:

Step 201: receiving locking instruction information transmitted from a user terminal for locking the UAV.

Step 202: based on the locking information, transmitting a locking command to a remote control device of the UAV to enable the remote control device to lock the UAV based on the locking command.

The entity for executing the method of FIG. 3 may be the server. Detailed implementations of step 201 and step 202 may be similar to those described above in connection with steps 101 and 102.

Step 203: transmitting an unlocking command to the remote control device to enable the remote control device to unlock the UAV.

In some embodiments, after the UAV is unlocked, the operator may continue to control the UAV to continue performing tasks. In some embodiments, after unlocking the UAV based on the unlocking command, when receiving an operation command input by the operator for controlling the UAV, the remote control device may control the UAV to perform actions based on the operation command.

In some embodiments, after the remote control device receives the unlocking command from the server, the remote control device may display a message to the operator indicating that the UAV has been unlocked, and that the remote control device can execute the operation command from the operator as usual.

In some embodiments, the user may unlock the UAV based on actual needs, or may pre-set a time for unlocking the UAV.

In some embodiments, before step 203 (i.e., transmitting the unlocking command to the remote control device), the method may also include: receiving unlocking instruction information transmitted from the user terminal; generating the unlocking command based on the unlocking instruction information.

In some embodiments, the user may perform operations to unlock the UAV based on actual needs. For example, the user may unlock the UAV when the lease is renewed by the lessee, or when the user replaced the operator of the UAV.

In some embodiments, when the user needs to unlock an already locked UAV, the user may directly input the unlocking instruction information at the user terminal. The user terminal may transmit the unlocking instruction information to the server to enable the server to instruct the remote control device to unlock the UAV based on the unlocking instruction information.

The disclosed method is simple, straightforward, and convenient for the user to flexibly unlock the UAV.

In some embodiments, the locking instruction information may include: a predetermined locked time period or scheduled unlocking time. Correspondingly, step 203 (i.e., transmitting an unlocking command to the remote control device) may include: when the time period in which the UAV is locked is longer than or equal to the predetermined locked time period, or when the scheduled unlocking time arrives, transmitting the unlocking command to the remote control device.

In some embodiments, the locking instruction information transmitted by the user terminal in step 201 may include a predetermined locked time period, such as 24 hours. After the server instructs the remote control device to lock the UAV based on the locking instruction information, and after the time period in which the UAV is locked is longer than or equal to the predetermined locked time period, e.g., after the UAV has been locked for 24 hours, the server may transmit the unlocking command to the remote control device to unlock the UAV.

In some embodiments, the locking instruction information may include a scheduled unlocking time, such as 20:00 on Nov. 22, 2016. After the server instructs the remote control device to lock the UAV based on the locking instruction information, when the scheduled unlocking time arrives, i.e., at 20:00 on Nov. 22, 2016, the server may transmit the unlocking command to the remote control device to unlock the UAV.

The disclosed method makes it convenient for the user to pre-set the time to unlock the UAV, such that when the pre-set time arrives, the server may automatically transmit the unlocking command to the remote control device. Thus, the disclosed method provides much convenience to the user.

In some embodiments, the disclosed method may also include:

receiving binding instruction information transmitted by the user terminal, the binding instruction information including information of the UAV and information of the operator bound with the UAV; based on the binding instruction information, transmitting a binding command to a corresponding remote control device, the binding command including the information of the operator, such that the remote control device only permits the operator bound with the UAV to log in or operate the UAV.

In some embodiments, the information of the UAV may include the name of the UAV, the identification of the UAV, the terminal serial number of the UAV. The information of the operator may include the name of the operator, the identification number of the operator, the employee number, the account number, etc. The user may bind the UAV with the operator to allow only the bound operator to operate the UAV.

In some embodiments, the user may input the binding instruction information at the user terminal. After receiving the binding instruction information, the server may transmit a binding command to a corresponding remote control device based on the binding instruction information. The binding command may include the information of the operator bound with the UAV.

In some embodiments, after the remote control device receives the binding command, the remote control device may store the information of the operator bound with the UAV. Thereafter, when an operator inputs log-in information at the remote control device, the remote control device may determine the information of the operator based on the log-in information. If the information of the operator corresponding to the log-in information does not belong to the information of the operator bound with the UAV, the remote control device does not allow the operator to log in or operate the UAV.

In some embodiments, the log-in information may include a user name and a password. The remote control device may determine information of the corresponding operator based on the user name of the log-in information.

In some embodiments, the information of the operator may be verified by the server. For example, after receiving the binding instruction information from the user terminal, the server may store the binding relationship between the information of the UAV and the corresponding information of the operator. When an operator inputs the log-in information at the remote control device, the remote control device may transmit the log-in information and the information of the UAV to the server. The server may determine whether the information of the operator corresponding to the log-in information has been bound with the information of the UAV. If the information of the operator corresponding to the log-in information has been bound with the information of the UAV, the server may transmit a message to the remote control device indicating that the verification is successful, such that the remote control device may allow the operator to log in or operate the UAV. If the information of the operator corresponding to the log-in information has not been bound with the information of the UAV, the server may transmit a message to the remote control device indicating that the verification is not successful, such that the remote control device may disallow the operator to log in or operate the UAV.

In some embodiments, through binding the information of the operator and the information of the UAV, the disclosed method enables the user to allow only specified operator to log in or operate the UAV, thereby improving the safety of the UAV.

In some embodiments, the method of FIG. 3 may also include:

after the UAV completes a task, determining a task performing quality level for the UAV based on a coincidence level between a predetermined specification of the task and actual performance of the task; transmitting the task performing quality level to the user terminal, such that the user terminal may provide the task performing quality level to the user.

In some embodiments, the predetermined specification of the task may include at least one of: a flight path, a flight height, a task performing time, or an amount of the task, etc.

In some embodiments, the user may pre-set the specification for a task. In some embodiments, the server may set the specification for a task based on a user's requirement on the task performing and based on actual condition of the task performing region. For example, the specification of a task may include: fly straight from point A to point B, with a distance of 10 km.

In some embodiments, after the UAV completes a task, the server may determine the task performing quality level for the UAV based on a coincidence level between the predetermined specification of the task and the actual performance of the task. For example, when performing a task from point A to point B, the UAV may fly along a straight line for the first 5 km, and may deviate from the predetermined flight path for the last 5 km. Then the coincidence level is 50%.

In some embodiments, based on the coincidence level, the server may determine the task performing quality level of the present task. In some embodiments, the task performing quality level may include two levels, such as pass or fail. In some embodiments, the task performing quality level may be divided into more than two levels, such as excellent, good, pass, and fail. The task performing quality level may be transmitted to the user terminal, such that the user terminal may provide the task performing quality level to the user. The user may be the owner of the UAV, or may be a trustor who entrusts the individual owner or corporate owner of the UAV to perform tasks.

In some embodiments, the user may assess the operator based on the task performing quality level. In some embodiments, the user may process the payment of a fee associated with the task performing. The server may automatically calculate the fee associated with the task performing based on the task performing quality level and predetermined rules for calculating the fees, and may provide the calculated fee to the user.

According to the disclosed method, after the UAV completes a task, the task performing quality level may be determined based on the coincidence level between the predetermined specification of the task and the actual performance of the task. By the disclosed method, whether the task performing satisfies a predetermined quality requirement can be determined in time, thereby improving the efficiency of processing fee payment related to the task performing conducted by the UAV and the efficiency of assessing the operator.

In some embodiments, the disclosed method may also include:

receiving crop information of at least one region input by the user, or determining the crop information of at least one region based on photographing information or sensing information acquired by the UAV; performing a statistical analysis on the crop information and storing the crop information.

In some embodiments, the user may input the crop information of at least one region through the user terminal. The user terminal may transmit the crop information to the server. In some embodiments, the server may obtain the photographing information or sensing information acquired by the UAV from the remote control device, and determine the crop information of the corresponding region.

In some embodiments, after determining crop information of multiple regions, the server may perform a statistic analysis on the crop information for each of the regions. The server may obtain the distribution of the crops in each state, city, county, village, or over the entire country or the world. Such distribution information may provide technical support for future development in agriculture, forest, fishing, or farming.

In some embodiments, the crop information may include crop types and starting dates over the past years when UAV-executed tasks were first performed for the crop types, respectively. Correspondingly, the disclosed method may also include: based on the crop information, within a predetermined time period before the starting dates, providing reminding messages to users who grow one or more crop types.

In some embodiments, based on a user input or information obtained by the UAV, the server may determine that in a certain region, weeding and spraying of pesticides for crop A are typically performed in April, then within a predetermined time period before April, the server may transmit reminding messages to users who grow crop A, to remind the users to perform tasks such as weeding or spraying pesticides. A user may be the owner of the UAV, or may be a trustor who entrusts the individual owner or corporate owner of the UAV to perform tasks. The predetermined time period may be set by the user, or may be a default time period, such as 7 days.

In some embodiments, the crop information may include a growing area for the crop and information indicating whether the crop suffered from attacks by diseases or insects. Correspondingly, the disclosed method may include: based on the crop information, calculating a proportion of an area in which the crop suffered from attacks by diseases or insects over the total growing area of the crop; if the proportion is greater than a predetermined value, providing an alert message to the user.

In some embodiments, the proportion may be determined based on the area of the crop that suffered from attacks by diseases or insects and the total growing area for the crop. If the proportion is greater than the predetermined value, it may indicate that the disaster is serious. The server may provide alert messages to the user who grow the particular type of crop or all of the users, to remind the user(s) to take a note and process the affected crop. The predetermined value may be set by the user, or may be a default value set based on actual needs, such as 30%.

In some embodiments, the disclosed method may also include:

receiving activation request information transmitted by the remote control device, the activation request information including personal information of the user who requests to activate the UAV; based on the personal information, determining whether to allow the user to activate the UAV; if it is determined to allow the user to activate the UAV, transmitting an activation instruction to the remote control device to instruct or enable the remote control device to activate the UAV based on the activation instruction.

In some embodiments, the seller of the UAV or the owner of the UAV may provide personal information that may be used to activate the UAV, including, for example, name, telephone number, identification number, account number, etc. When the UAV needs to be activated, a user may first log into the remote control device, and then input the personal information. The remote control device may transmit activation request information to the server. The activation request information may include the personal information of the user who requests to activate the UAV.

In some embodiments, the server may determine whether to allow the user to activate the UAV based on the personal information. If the server determines to allow the user to activate the UAV, the server may transmit an activation instruction to the remote control device to enable the remote control device to activate the UAV based on the activation instruction. In some embodiments, only after the activation, the user is allowed to operate the UAV through the remote control device.

In some embodiments, if the personal information included in the activation request information is inconsistent with the personal information previously received by the server that would permit the activation of the UAV, or if the server has not yet received the personal information from the user terminal that would permit the activation of the UAV, then the server may transmit an activation failure message to the remote control device. The remote control device may provide the activation failure message to the user who requests to activate the UAV.

In some embodiments, by setting the activation process, the disclosed method allows activation of a UAV only by a user whose personal information has been registered at the server. This further enhances the safety of the UAV, and facilitates the management of the UAV.

In some embodiments, the disclosed method may include:

transmitting a no-fly command to the remote control device, the no-fly command including a no-fly region and/or a no-fly time (e.g., at least one of a no-fly region or a no-fly time).

In some embodiments, the no-fly command may be set by the user. For example, the user may transmit the no-fly region and no-fly time related to the UAV the user owns to the server through the user terminal. In some embodiments, the no-fly command may be set by the server. For example, a certain region or a certain time may pose danger to the UAV or due to certain political reasons, the UAV cannot fly in a certain region or at a certain time.

In some embodiments, after the remote control device receives the no-fly command transmitted by the server, based on the no-fly command, the remote control device may ban the UAV from flying in the no-fly region and/or at the no-fly time.

In some embodiments, after the server transmits the no-fly command to the remote control device, the disclosed method may also include:

receiving ban-lifting request information transmitted by the operator through the remote control device; transmitting the ban-lifting request information to the user terminal to enable the user to determine whether to lift the ban on flight based on the ban-lifting request information; receiving ban-lifting instruction information sent by the user through the user terminal after the user determines to lift the ban on flight, and transmitting a ban-lifting command to the remote control device based on the ban-lifting instruction information to enable the remote control device to lift the ban on flight for the UAV based on the ban-lifting command.

The above described processes can be applied to the situation where the user sets a no-fly region and/or a no-fly time for the UAV. After the flight is banned for the UAV, the remote control device may receive ban-lifting request information input by the operator, and may transmit the ban-lifting request information to the server.

In some embodiments, the server may provide the ban-lifting request information to the user. When the user determines to lift the ban on flight, the user may input the ban-lifting instruction information through the user terminal. The user terminal may transmit the ban-lifting instruction information to the server. Based on the ban-lifting instruction information, the server may transmit a ban-lifting command to the remote control device. After receiving the ban-lifting command transmitted by the server, the remote control device may control the UAV to lift the ban on flight based on the ban-lifting command.

In the present disclosure, by setting the no-fly region and/or the no-fly time, the flight safety of the UAV is improved. After the flight of the UAV is banned, the operator may send ban-lifting request information through the remote control device, to request the user to lift the ban. The disclosed method makes it convenient for the user to manage the operator and the UAV.

According to the disclosed method for controlling the UAV, an unlocking command may be transmitted to the remote control device to enable the remote control device to unlock the UAV in time, thereby improving the flexibility in controlling the UAV.

In some embodiments, the user may log in through a browser software or an application ("App") provided in the user terminal. After logging in, the user may configure or manage the UAV owned by the user.

For example, the user may log in through a browser on the user terminal. After the user terminal is installed with the browser, the user may open the website of the user management platform by various methods, such as inputting the URL of the website, clicking a hyperlink of the website, or scanning a QR code. After opening the user management platform website, the user may log in using an account name or number. After logging in, the user may perform various functions or processes described above.

In some embodiments, the user management platform website may display buttons or function areas relating to locking, unlocking, binding, etc. The user may click a corresponding button or function area to send the locking instruction information, unlocking instruction information, or binding instruction information to the server to realize the various functions described above.

In some embodiments, the disclosed method also includes functions such as UAVs and staff management, task assignment, and lease, which are described below.

After a user logs into the user management platform website, the user may manage the UAVs and the staff as follows:

1. UAV Management

Changing a name of a UAV, binding UAV, releasing the binding of UAV, looking up activation time, insurance information, hardware ID of UAV, version of firmware, serial number of UAV body, insurance policy number, insurance company, etc.

2. Staff Management

Adding a team member, deleting a team member, grouping team members, looking up information about a team member.

3. Post-Sale Management

The server may retrieve post-sale information of each UAV owned by the user from a database (e.g., repair progress information, repair history information, and post-sale feedback information, etc.), and transmit the post-sale information to the user terminal. The user terminal may relate the post-sale information and information of the UAV, and display related information to the user.

4. Flight Record

The remote control device may transmit data of path points along the flight path of the UAV, and task information such as crop type, spray time and spray acreage, to the server. The server may transmit the received information to the user terminal. The user may playback the data of the path points in the user management platform website, look up the task information related to each task, and output the task information into a table.

5. Real Time Data Display

The user terminal may display in real time, on a map, the flight information of the UAV, such that the user may control the UAV remotely to lock, send an alarm, or unlock, or to send task assignment to the UAV.

6. Account Information

On the user terminal, the user may look up the team information, company certificate information, and team ID. The user may also manage the password or search for a UAV.

7. Second-Level Corporate Account

An operator may log into the user management platform website. However, in some embodiments, the operator may be allowed to only look up the information of the UAV that has been bound to the operator, and the task assignment that has been assigned to the operator. In some embodiments, the operator may not have the right to manage or modify the UAV and the staff.

In some embodiments, when the user forms a team, the user may authorize an operator's account to be a second-level corporate account. After logging in the user management platform website, an operator having the second-level corporate account may manage the UAV of the team and the team members.

8. Task Assignment

The server may obtain order information transmitted from a trustor. In some embodiments, the order information may be input by the trustor through a trust platform, or may be obtained through a salesperson. The order information may include: task performing time, task performing address, task performing area, crop type, and task performing method, etc.

In some embodiments, after obtaining the order information, the server may transmit the order information to the user terminal, such that the user terminal may display the order information on the user management platform website. The user may assign an operator and/or a UAV for the task associated with the order information through the user terminal. The user terminal may transmit assignment information to the server. The assignment information may include information about the operator and/or the UAV that are assigned to the task associated with the order information.

In some embodiments, based on the assignment information, the server may transmit task information to the remote control device corresponding to the UAV. The task information may include information relating to a time, address, and crop associated with the task, such that the operator of the UAV may execute the task based on the task information.

In some embodiments, when the UAV performs the task, the server may transmit information relating to the actual task performing status to the user terminal in real time. After the task is completed, the user may determine a task performing result based on the actual task performing status, and may calculate the cost, price, etc., associated with the task.

9. Leasing Service

Industry application UAVs, such as agriculture UAVs, typically do not adopt a business mode in which individual farmers purchase their own UAVs. Instead, the business model is to lease UAVs from corporates who own the UAVs by organizations formed by farmers. In other words, a corporate may purchase a number of UAVs. While the corporate may use a portion of the UAVs in its industrial applications, the corporate may lease out unused UAVs, or may run a business of leasing and maintaining the UAVs. The lease may be determined based on flight mileage, flight time, or lease time.

In some embodiments, the lease procedure may include: first, the user determines a method of collecting the lease fee, which is typically calculated based on the acreage of the field. Then, the user may set the control right and the team forming right for the lessee on the user management platform website. After the lease starts, the server may release corresponding functions to the lessee based on the control right and the team forming right. During the lease, the lessee may pay the lease fee based on the real time flight record. The user may set the lease expiration date on the user management platform website, such that the UAV may be locked after the lease expires, so the UAV cannot take off.

Figure 4:
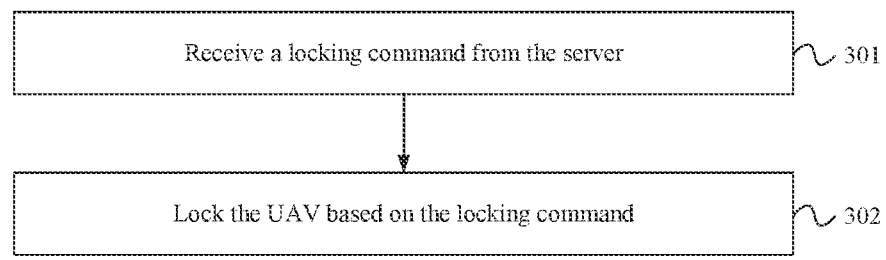
FIG. 4 is a flow chart illustrating a method for controlling a UAV, according to another example embodiment.

The present disclosure also provides another method for controlling a UAV. FIG. 4 is a flow chart illustrating another method for controlling the UAV. The method of FIG. 4 may include:

Step 301: receiving a locking command from the server.

Step 302: locking the UAV based on the locking command.

In some embodiments, the entity that may execute the method of FIG. 4 may be the remote control device. An operator may log in and operate the UAV through an App installed in the remote control device. Every time the operator logs in, a verification is performed to determine whether the operator is an operator who has been bound with the UAV corresponding to the remote control device. If the operator is not one who has been bound with the UAV corresponding to the remote control device, the operator will not be able to log in the App and will not be able to operate the UAV.

In some embodiments, after successfully logs in, the operator may establish a new task or input a historical task. Through the App, the operator may also look up information of the corporate account, information of the UAV, record of task performed by the team, etc.

In some embodiments, the detailed implementation of the method of FIG. 4 for controlling the UAV may be similar to the implementations of the other methods disclosed herein.

According to the method for controlling UAV, a locking command may be received from the server. Based on the locking command, the UAV may be locked. By locking the UAV in time under the instruction received from the server, the lessee or the operator is prevented from continued operation of the UAV. This improves the flexibility of controlling the UAV, and provides convenience to the user.

In some embodiments, after step 302 (i.e., after locking the UAV based on the locking command), the disclosed method may also include:

receiving an operation command input by the operator for controlling the UAV; abandoning execution of the operation command and displaying a reminding message to the operator indicating that the UAV has been locked.

In some embodiments, locking the UAV based on the locking command may include:

if the UAV is located on the ground, locking the UAV; if the UAV is in the air, locking the UAV after the UAV has landed.

In some embodiments, receiving the locking command from the server may include:

receiving task performing information transmitted by the UAV in real time while performing the task; transmitting the task performing information to the server, such that the server may transmit the task performing information to the user; receiving the locking command generated by the server based on the locking instruction information input by the user when observing an anomaly in the task performing information.

In some embodiments, the task performing information may include at least one of: a flight location, a flight velocity, a flight height, or an aerial photographing image.

In some embodiments, receiving the locking command from the server may include:

transmitting a total flight mileage travelled by the UAV after the use of the UAV is authorized to the server; receiving a locking command transmitted by the server after the total flight mileage travelled by the UAV after the use of the UAV is authorized reaches an authorized flight mileage.

In some embodiments, receiving the locking command from the server may include:

transmitting a total flight time of the UAV after the use of the UAV is authorized to the server; receiving the locking command transmitted by the server after the total flight time of the UAV after the use of the UAV is authorized reaches an authorized flight time.

In some embodiments, after locking the UAV based on the control command, the disclosed method may also include:

receiving an unlocking command from the server; unlocking the UAV based on the unlocking command.

In some embodiments, the disclosed method may also include:

receiving a binding command from the server, the binding command including information of the operator bound with the UAV; storing the information of the operator bound with the UAV; receiving an input of log in information from the operator; if the information of the operator corresponding to the log in information does not belong to the information of the operator bound with the UAV, disallowing the operator to log in or operate the UAV.

In some embodiments, the disclosed method may also include:

receiving photographing information or sensing information acquired by the UAV; transmitting the photographing information or sensing information to the server, such that the server may determine crop information based on the photographing information or sensing information and store the crop information.

In some embodiments, the disclosed method may also include:

receiving activation request information input from the user, the activation request information including personal information of the user who requests to activate the UAV; transmitting the activation request information to the server, such that the sever may determine, based on the personal information, whether to allow the user to activate the UAV; receiving an activation command transmitted by the server after determining to allow activating the UAV; activating the UAV based on the activation command.

In some embodiments, the disclosed method may also include:

receiving a no-fly command transmitted from the server, the no-fly command including a no-fly region and/or a no-fly time; based on the no-fly command, banning the UAV to fly at the no-fly region and/or no-fly time.

In some embodiments, the disclosed method may also include:

receiving ban-lifting request information input by an operator; transmitting the ban-lifting request information to the server, such that the server may provide the ban-lifting request information to the user, who may determine whether to lift the ban on flight based on the ban-lifting request information; receiving a ban-lifting command transmitted by the server after the user determines to lift the ban on flight; lifting the ban on flight based on the ban-lifting command.

Figure 5:
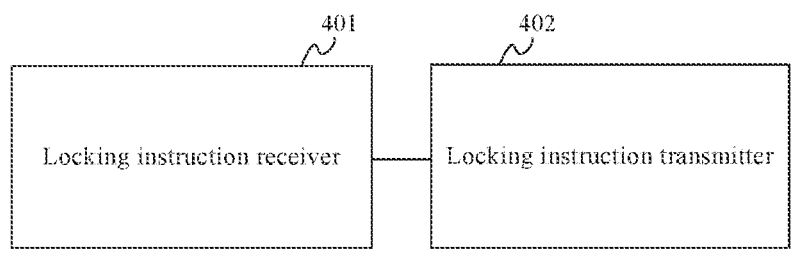
FIG. 5 is a schematic diagram of a server, according to an example embodiment.

The present disclosure also provides a server. FIG. 5 is a schematic diagram of the server. The server shown in FIG. 5 may include:

a locking instruction receiver 401 configured to receive locking instruction information transmitted from the user terminal for locking the UAV;

a locking instruction transmitter 402 configured to transmit a locking command to the remote control device of the UAV based on the locking instruction information, such that the remote control device may lock the UAV based on the locking command.

In some embodiments, the server may be configured to execute the method described above in connection with FIG. 1. The detailed description of the function performed by the server may refer to the above descriptions of the method of FIG. 1.

In some embodiments, the server may receive the locking instruction information transmitted from the user terminal for locking the UAV, and may transmit the locking command to the remote control device of the UAV based on the locking instruction information, such that the remote control device may lock the UAV based on the locking command. As a result, the disclosed server enables the user to lock the UAV in time when the lease expires or when the user observes unreasonable behavior conducted by the operator. Through the disclosed server, the user may prevent continued operation of the UAV by the lessee or the operator, thereby realizing flexible control of the UAV, and providing convenience to the user.

In some embodiments, the locking instruction receiver 401 may be configured to: obtain task performing information uploaded by the UAV in real time while the UAV performs the task; transmit the task performing information to the user terminal, such that the user terminal may provide the task performing information to the user, which enables the user to input the locking instruction information when observing an anomaly in the task performing information.

In some embodiments, the task performing information may include at least one of: a flight location, a flight velocity, a flight height, or an aerial photographing image.

In some embodiments, the locking instruction information may include a scheduled locking time. Correspondingly, the locking instruction transmitter 402 may be configured to: based on the locking instruction information, at the schedule locking time, transmit the locking command to the remote control device of the UAV, such that the remote control device may lock the UAV at or right after the scheduled locking time.

In some embodiments, the locking instruction information may include: an authorized flight mileage. Correspondingly, the locking instruction transmitter 402 may be configured to: obtain a total flight mileage travelled by the UAV after the use of the UAV is authorized; when the total flight mileage of the UAV reaches the authorized flight mileage, transmit the locking command to the remote control device.

In some embodiments, the locking instruction information may include: an authorized flight time. Correspondingly, the locking instruction transmitter 402 may be configured to: obtain a total flight time of the UAV after the use of the UAV is authorized; when the total flight time of the UAV reaches the authorized flight time, transmit the locking command to the remote control device.

In some embodiments, the server may also include an unlocking command transmitter configured to transmit an unlocking command to the remote control device, such that the remote control device may unlock the UAV.

In some embodiments, the unlocking command transmitter may be configured to: receive unlocking instruction information transmitted from the user terminal; generate the unlocking command based on the unlocking instruction information.

In some embodiments, the locking instruction information may include a predetermined locked time period or a scheduled unlocking time. Correspondingly, the unlocking command transmitter may be configured to: transmit the unlocking command to the remote control device when the time period in which the UAV is locked reaches the predetermined locked time period or when the schedule unlocking time has arrived.

In some embodiments, the locking instruction receiver 401 may be configured to: receive binding instruction information transmitted by the user terminal, the binding instruction information including information of the UAV and information of the operator bound with the UAV; based on the bounding instruction information, transmit a binding command to the remote control device of the corresponding UAV, the binding command including information of the operator, such that the remote control device only permits the operator who is bound with the UAV to log in or operate the UAV.

In some embodiments, the locking instruction receiver 401 may be configured to: after the UAV completes the task, determine a task performing quality level for the UAV based on a coincidence level between a predetermined specification of the task and actual performance of the task; transmit the task performing quality level to the user terminal, such that the user terminal may provide the task performing quality level to the user.

In some embodiments, the predetermined specification of the task may include at least one of: a flight path, a flight height, a task performing time, an amount of the task, etc.

In some embodiments, the locking instruction receiver 401 may be configured to: receive crop information of at least one region input by the user, or determine the crop information of at least one region based on photographing information or sensing information acquired by the UAV; perform a statistical analysis on the crop information and store the crop information.

In some embodiments, the crop information may include crop types and starting dates over the past years when UAV-executed tasks were first performed for the crop types. Correspondingly, the locking instruction receiver 401 may be configured to: based on the crop information, within a predetermined time period before the starting dates, provide reminding messages to users who grow one or more crop types.

In some embodiments, the crop information may include a growing area for the crop and information indicating whether the crop suffered from attacks by diseases or insects. Correspondingly, the locking instruction receiver 401 may be configured to: based on the crop information, calculate a proportion of an area in which the crop suffered from attacks by diseases or insects over the total growing area of the crop; if the proportion is greater than a predetermined value, provide an alert message to the user.

In some embodiments, the locking instruction receiver 401 may be configured to:

receive activation request information transmitted by the remote control device, the activation request information including personal information of the user who requests to activate the UAV; based on the personal information, determine whether to allow the user to activate the UAV; if it is determined to allow the user to activate the UAV, transmit an activation instruction to the remote control device to instruct or enable the remote control device to activate the UAV based on the activation instruction.

In some embodiments, the locking instruction receiver 401 may be configured to:

transmit a no-fly command to the remote control device, the no-fly command including a no-fly region and/or a no-fly time.

In some embodiments, the locking instruction receiver 401 may be configured to:

receive ban-lifting request information transmitted by the operator through the remote control device; transmit the ban-lifting request information to the user terminal to enable the user to determine whether to lift the ban on flight based on the ban-lifting request information; receive ban-lifting instruction information sent by the user through the user terminal after the user determines to lift the ban on flight, and transmit a ban-lifting command to the remote control device based on the ban-lifting instruction information to enable the remote control device to lift the ban on flight for the UAV based on the ban-lifting command.

Figure 6:
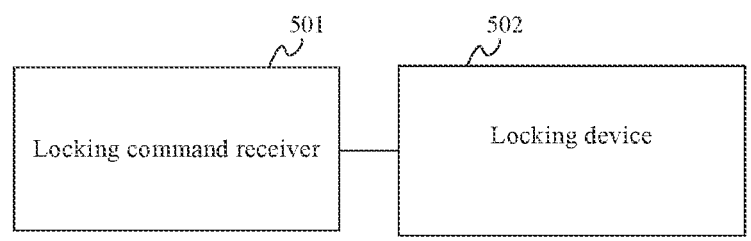
FIG. 6 is a schematic diagram of a remote control device, according to an example embodiment.

The present disclosure also provides a remote control device. FIG. 6 is a schematic diagram of a remote control device. The remote control device of FIG. 6 may include:

a locking command receiver 501 configured to receive a locking command from the server;

a locking device 502 configured to lock the UAV based on the locking command.

In some embodiments, the remote control device may be configured to execute the method shown in FIG. 4. Detailed descriptions of the execution of the method may refer to the descriptions of the method shown in FIG. 4.

In some embodiments, the remote control device may receive the locking command transmitted by the server. The remote control device may lock the UAV based on the locking command. By configuring the remote control device to lock the UAV in time under the instruction of the server, the present disclosure avoids continued operation of the UAV by the lessee or the operator, thereby realizing flexible control of the UAV and providing convenience to the user.

In some embodiments, the locking device 502 may be configured to: receive an operation command input by the operator for controlling the UAV; abandon execution of the operation command, and provide a reminding message to the operator indicating that the UAV has been locked.

In some embodiments, the locking device 502 may be configured to: directly lock the UAV if the UAV is located on the ground; if the UAV is in the air, lock the UAV after the UAV has landed.

In some embodiments, the locking instruction receiver 501 may be configured to:

receive task performing information uploaded by the UAV in real time while performing the task; transmit the task performing information to the server, such that the server may transmit the task performing information to the user; receive the locking command generated by the server based on the locking instruction information input by the user when observing an anomaly in the task performing information.

In some embodiments, the task performing information may include at least one of: a flight location, a flight velocity, a flight height, or an aerial photographing image.

In some embodiments, the locking instruction receiver 501 may be configured to:

transmit a total flight mileage travelled by the UAV after the use of the UAV is authorized to the server; receive a locking command transmitted by the server after the total flight mileage travelled by the UAV after the use of the UAV is authorized reaches an authorized flight mileage.

In some embodiments, the locking instruction receiver 501 may be configured to:

transmit a total flight time of the UAV after the use of the UAV is authorized to the server; receive the locking command transmitted by the server after the total flight time of the UAV after the use of the UAV is authorized reaches an authorized flight time.

In some embodiments, the locking device 502 may be configured to: receive the locking command transmitted by the server; lock the UAV based on the locking command.

In some embodiments, the locking instruction receiver 501 may be configured to:

receive a binding command from the server, the binding command including information of the operator bound with the UAV; store the information of the operator bound with the UAV.

In some embodiments, the locking instruction receiver 501 may be configured to:

receive an input of log in information from the operator; if the information of the operator corresponding to the log in information does not belong to the information of the operator bound with the UAV, disallow the operator to log in or operate the UAV.

In some embodiments, the locking instruction receiver 501 may be configured to:

receive photographing information or sensing information acquired by the UAV; transmit the photographing information or sensing information to the server, such that the server may determine crop information based on the photographing information or sensing information and store the crop information.

In some embodiments, the locking instruction receiver 501 may be configured to:

receive activation request information input from the user, the activation request information including personal information of the user who requests to activate the UAV; transmit the activation request information to the server, such that the sever may determine, based on the personal information, whether to allow the user to activate the UAV.

In some embodiments, the locking instruction receiver 501 may be configured to:

receive an activation command transmitted by the server after determining to allow activating the UAV; activate the UAV based on the activation command.

In some embodiments, the locking instruction receiver 501 may be configured to:

receive a no-fly command transmitted from the server, the no-fly command including a no-fly region and/or a no-fly time; based on the no-fly command, ban the UAV to fly at the no-fly region and/or no-fly time.

In some embodiments, the locking instruction receiver 501 may be configured to:

receive ban-lifting request information input by an operator; transmit the ban-lifting request information to the server, such that the server may provide the ban-lifting request information to the user, who may determine whether to lift the ban on flight based on the ban-lifting request information.

In some embodiments, the locking instruction receiver 501 may be configured to:

receive a ban-lifting command transmitted by the server after the user determines to lift the ban on flight; lift the ban on flight based on the ban-lifting command.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using indirect coupling or communication between various interfaces, devices, or units. The indirect couplings or communication connections between interfaces, devices, or units may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated unit may be realized using hardware or a combination of hardware and software.

If the integrated units are realized as software functional units, the integrated units may be stored in a computer-readable storage medium. The software functional units may be storage in a non-transitory storage medium, including instructions or codes for causing a computing device (e.g., personal computer, server, or network device, etc.) or a processor to execute some or all of the steps of the disclosed methods. The storage medium may include any suitable medium that can store program codes or instructions, such as at least one of a U disk (e.g., flash memory disk), a mobile hard disk, a read-only memory ("ROM"), a random access memory ("RAM"), a magnetic disk, or an optical disc.

The computer-readable storage medium may be an internal storage device included in the disclosed flight control device and/or system, such as a hard disk or a memory. In some embodiments, the computer-readable storage medium may be an external device external to the disclosed flight control device and/or system. The computer-readable storage medium may be a plug-and-play hard disk, a smart media card ("SMC"), a secure digital card ("SD"), a flash card, etc. The computer-readable storage medium may include both an internal storage medium of the disclosed device and/or system, and an external storage medium of the disclosed device and/or system. The computer-readable storage medium may be configured to store the computer program code and other programs or data. In some embodiments, the computer-readable storage medium may be configured to temporarily store data that have already been output or that will be output.

A person having ordinary skill can appreciate that all or some of the steps of the disclosed methods may be implemented through hardware that implements the computer program code. The computer program code may be stored in a computer-readable storage medium. When the computer program code is executed, the steps of the disclosed methods may be performed. The non-transitory computer-readable storage medium can be any medium that can store program codes, for example, a magnetic disk, an optical disk, a read-only memory ("ROM"), and a random-access memory ("RAM"), etc.

A person having ordinary skill in the art can appreciate that for convenience and simplicity, the above descriptions described the division of the functioning units. In practical applications, the disclosed functions may be realized by various functioning units. For example, in some embodiments, the internal structure of a device may be divided into different functioning units to realize all or part of the above-described functions. The detailed operations and principles of the device are similar to those described above, which are not repeated.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A method for controlling an unmanned aerial vehicle (UAV), comprising:

receiving locking instruction information for locking the UAV;

remotely controlling, based on the locking instruction information, a remote control device of the UAV to lock the UAV; and remotely controlling, after controlling the remote control device to lock the UAV, the remote control device to unlock the UAV.

2. The method of claim 1, further comprising:

receiving log-in information input by an operator;

if information of the operator corresponding to the log-in information does not belong to information of an operator bound with the UAV, controlling the remote control device to not allow the operator corresponding to the log-in information to log in or operate the UAV.

3. The method of claim 1, further comprising:

after the UAV completes a task, determining a task performing quality level for the UAV based on a coincidence level between a predetermined specification of the task and actual performance of the task; and transmitting the task performing quality level to a user terminal.

4. The method of claim 3, wherein the predetermined specification of the task includes at least one of a flight path, a flight height, a task performing time, or an amount of the task.

5. The method of claim 1, further comprising:
after locking the UAV based on the locking instruction information,
receiving an operation command input by an operator for controlling the UAV; and
controlling the remote control device to abandon execution of the operation command.

6. The method of claim 5, further comprising:
controlling the remote control device to display a reminding message to the operator indicating that the UAV has been locked.

7. The method of claim 1, wherein controlling, based on the locking instruction information, the remote control device to lock the UAV includes:
controlling the remote control device to directly lock the UAV if the UAV is located on the ground; and
if the UAV is in air, controlling the remote control device to lock the UAV after the UAV has landed.

8. The method of claim 1, further comprising:
prior to receiving the locking instruction information,
obtaining task performing information uploaded by the UAV in real time while the UAV performs a task; and
transmitting the task performing information to a user terminal.

9. The method of claim 8, wherein the task performing information includes at least one of a flight location, a flight velocity, a flight height, or an aerial photographing image.

10. The method of claim 1,
wherein the locking instruction information includes an authorized flight mileage, and
wherein controlling the remote control device to lock the UAV includes:
obtaining a total flight mileage travelled by the UAV after use of the UAV is authorized; and
when the total flight mileage of the UAV reaches the authorized flight mileage, controlling the remote control device to lock the UAV.

11. The method of claim 1,
wherein the locking instruction information includes an authorized flight time; and
controlling the remote control device to lock the UAV includes:
obtaining a total flight time of the UAV after use of the UAV is authorized; and
when the total flight time reaches the authorized flight time, controlling the remote control device to lock the UAV.

12. The method of claim 1,
wherein the locking instruction information includes a scheduled locking time, and
wherein controlling the remote control device to lock the UAV includes:
based on the locking instruction information, when the scheduled locking time arrives, controlling the remote control device to lock the UAV.

13. The method of claim 1,
wherein the locking instruction information includes: a predetermined locked time period or a scheduled unlocking time,
wherein controlling the remote control device to unlock the UAV includes:
when a time period in which the UAV is locked is longer than or equal to the predetermined locked time period, or when the scheduled unlocking time arrives, controlling the remote control device to unlock the UAV.

14. A server, comprising:
a processor; and
a non-transitory storage medium coupled to the processor and storing instructions that, when executed by the processor, cause the processor to:
receive locking instruction information for locking an unmanned aerial vehicle (UAV);
remotely control, based on the locking instruction information, a remote control device of the UAV to lock the UAV; and
remotely control, after controlling the remote control device to lock the UAV, the remote control device to unlock the UAV.

15. The server of claim 14, wherein the processor is further configured to:
obtain task performing information uploaded by the UAV in real time while the UAV performs a task; and
transmit the task performing information to a user terminal to enable the user terminal to provide the task performing information to the user.

16. A remote control device for an unmanned aerial vehicle (UAV), comprising:
a processor; and
a non-transitory storage medium coupled to the processor and storing instructions that, when executed by the processor, cause the processor to:
remotely communicate with a server to receive a locking command transmitted by a server, the locking command being generated based on locking instruction information;
in response to receiving the locking command, lock the UAV based on the locking command;
remotely communicate with the server to receive, after locking the UAV based on the locking command, an unlocking command transmitted by the server; and
in response to receiving the unlocking command, unlock the UAV based on the unlocking command.

17. The remote control device of claim 16, the processor is further configured to:
after locking the UAV based on the locking instruction information,
receive an operation command input by an operator for controlling the UAV; and
abandoning execution of the operation command.

18. The remote control device of claim 17, the processor is further configured to:
displaying a reminding message to the operator indicating that the UAV has been locked.

19. The remote control device of claim 16, wherein the processor is further configured to:
control the remote control device to directly lock the UAV if the UAV is located on the ground; and
if the UAV is in air, control the remote control device to lock the UAV after the UAV has landed.

20. The remote control device of claim 16, wherein the locking command indicates at least one of an authorized flight mileage, an authorized flight time, a scheduled locking time, a predetermined locked time period, or a scheduled unlocking time.

* * * * *